US012412707B2

(12) United States Patent
Dittmann et al.

(10) Patent No.: US 12,412,707 B2
(45) Date of Patent: *Sep. 9, 2025

(54) SWITCH ASSEMBLY WITH DRIVE SYSTEM AND METHOD FOR DRIVING A SWITCH

(71) Applicant: Maschinenfabrik Reinhausen GmbH, Regensburg (DE)

(72) Inventors: Benjamin Dittmann, Neutraubling (DE); Eugen Nagel, Regensburg (DE); Sebastian Schmid, Sinzing (DE)

(73) Assignee: MASCHINENFABRIK REINHAUSEN GMBH, Regensburg (DE)

( * ) Notice: Subject to any disclaimer, the term of this patent is extended or adjusted under 35 U.S.C. 154(b) by 572 days.

This patent is subject to a terminal disclaimer.

(21) Appl. No.: 17/608,998

(22) PCT Filed: Apr. 23, 2020

(86) PCT No.: PCT/EP2020/061276
§ 371 (c)(1),
(2) Date: Nov. 5, 2021

(87) PCT Pub. No.: WO2020/229120
PCT Pub. Date: Nov. 19, 2020

(65) Prior Publication Data

US 2022/0216014 A1 Jul. 7, 2022

(30) Foreign Application Priority Data

May 15, 2019 (DE) ..................... 10 2019 112 711.4

(51) Int. Cl.
*H01H 3/26* (2006.01)

(52) U.S. Cl.
CPC ......... *H01H 3/26* (2013.01); *H01H 2003/266* (2013.01)

(58) Field of Classification Search
CPC ....................................... H01H 3/26–2003/266
See application file for complete search history.

(56) References Cited

U.S. PATENT DOCUMENTS

| | | | |
|---|---|---|---|
| 5,736,827 A | 4/1998 | Dohnal et al. | |
| 7,109,670 B1 | 9/2006 | Rehm | |
| 9,143,072 B2 * | 9/2015 | Teising | H01H 33/6661 |
| 12,154,743 B2 | 11/2024 | Schmid et al. | |
| 2015/0171783 A1 | 6/2015 | Kammerl et al. | |

FOREIGN PATENT DOCUMENTS

| | | |
|---|---|---|
| EP | 2691967 B1 | 3/2017 |
| RU | 2638037 C2 | 12/2017 |
| WO | WO 0036621 A1 | 6/2000 |
| WO | WO 2008024048 A1 | 2/2008 |
| WO | WO 2012135209 A1 | 10/2012 |

* cited by examiner

*Primary Examiner* — Vanessa Girardi
(74) *Attorney, Agent, or Firm* — LEYDIG VOIT & MAYER LTD.

(57) ABSTRACT

A switch assembly includes a switch; and a drive system for the switch. The drive system includes: a drive shaft connecting the drive system to the switch; a motor configured to drive the drive shaft; and a feedback system, which is configured to determine at least two values for a position of the drive shaft; and to generate a feedback signal on the basis of the at least two values; and a control device which is configured to influence an operation of the motor depending on the feedback signal.

20 Claims, 2 Drawing Sheets

SWITCH ASSEMBLY WITH DRIVE SYSTEM AND METHOD FOR DRIVING A SWITCH

CROSS REFERENCE TO RELATED APPLICATIONS

This application is a U.S. National Phase application under 35 U.S.C. § 371 of International Application No. PCT/EP2020/061276, filed on Apr. 23, 2020, and claims benefit to German Patent Application No. DE 10 2019 112 711.4, filed on May 15, 2019. The International Application was published in German on Nov. 19, 2020, as WO 2020/229120 A1 under PCT Article 21(2).

FIELD

The invention relates to a switch assembly having a switch and a drive system for the switch, and also to a method for driving a switch.

BACKGROUND

In substations, there are a large number of switches for different tasks and with different requirements. To operate the various switches, they must be driven via a drive system. These switches include, amongst others, on-load tap-changers, diverter switches, selectors, double reversing change-over selectors, reversing change-over selectors, change-over selectors, circuit breakers, on-load switches or disconnecting switches.

For example, on-load tap-changers are used for uninterrupted switchover between different winding taps of an item of electrical equipment, such as a power transformer or a controllable reactor. For example, this makes it possible for the transmission ratio of the transformer or the inductance of the reactor to be changed. Double reversing change-over selectors are used to reverse the polarity of windings during power transformer operation.

All of these switches represent a highly safety-relevant component of the electrical equipment, because the switchover takes place while the equipment is in operation and is accordingly connected to a power network, for example. In extreme cases, malfunctions during operation can have serious technical and economic consequences.

SUMMARY

In an embodiment, the present disclosure provides a switch assembly that includes a switch; and a drive system for the switch. The drive system includes: a drive shaft connecting the drive system to the switch; a motor configured to drive the drive shaft; and a feedback system, which is configured to determine at least two values for a position of the drive shaft; and to generate a feedback signal on the basis of the at least two values; and a control device which is configured to influence an operation of the motor depending on the feedback signal.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
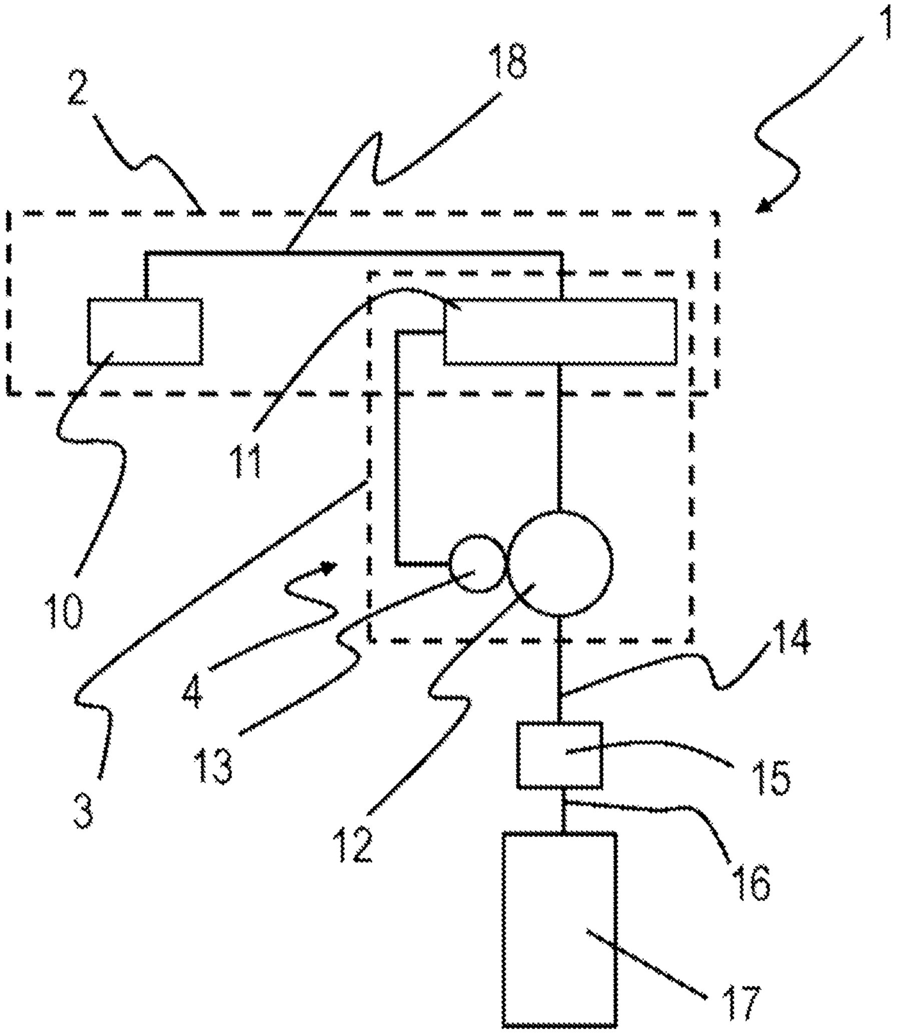
FIG. 1 a schematic representation of an exemplary embodiment of a switch assembly according to the improved concept.

Embodiments of the present invention provide an improved concept for driving a switch, in particular an on-load tap-changer, diverter switch, selector, double reversing change-over selector, reversing change-over selector, change-over selector, circuit breaker, on-load switch or disconnecting switch, by means of which concept the operational reliability is increased.

The improved concept is based, inter alia, on the idea of equipping a drive shaft for driving the switch with a feedback system which is able to detect at least two values for a position of the drive shaft. The operation of the motor is influenced based on a feedback signal which is generated depending on the two values.

According to an embodiment of the improved concept, a switch assembly comprising a switch and a drive system for the switch is provided. The drive system has a drive shaft connecting the drive system to the switch, a motor for driving the drive shaft and a feedback system. The feedback system is designed to determine at least two values for a position of the drive shaft and to generate a feedback signal based on the at least two values. In addition, the drive system has a control device which is designed to influence an operation of the motor depending on the feedback signal.

According to at least one embodiment, the switch can be configured as an on-load tap-changer or a diverter switch or a selector or a double reversing change-over selector or a reversing change-over selector or a change-over selector or a circuit breaker or an on-load switch or a disconnecting switch.

The expression "values for the position of the drive shaft" also includes those values of measurement variables from which the position of the drive shaft can be unambiguously determined, if necessary within a tolerance range.

By determining at least two values for the position of the drive shaft, the control device can carry out a plausibility check of the position determination or a reconciliation of the two values and can thereby increase the reliability of the position determination and to reduce the corresponding residual risk of an incorrect position determination. In addition, a partial failure of the feedback device, such that only one value can still be determined for the position of the drive shaft, does not necessarily lead to the immediate stopping of the drive shaft. At least the switch can still be moved into a safe operating position in a controlled manner despite the partial failure. Ultimately, this increases the operational reliability of the drive system, the switch and the equipment. In summary, the determination of two values for the position of the drive shaft increases the reliability, by way of a partial failure being reliably detected, and availability, since switching is brought reliably to its conclusion despite the partial failure.

According to at least one embodiment, the drive system is used to drive a shaft of the switch, for example on-load tap-changer or a corresponding component of the on-load tap-changer. This causes the on-load tap-changer, for example, to perform one or more operations, such as a switchover between two winding taps of an item of equipment or parts of the switchover, such as a diverter switch operation, selector operation, change-over selector operation or double reversing change-over selector operation.

According to at least one embodiment, the drive shaft is connected directly or indirectly, in particular via one or more gear units, to the switch, in particular to the shaft of the switch.

According to at least one embodiment, the drive shaft is connected directly or indirectly, in particular via one or more gear units, to the diverter switch, selector, double reversing change-over selector, reversing change-over selector, circuit breaker, on-load switch or disconnecting switch, in particular to the shaft of the diverter switch, selector, double reversing change-over selector, reversing change-over selector, circuit breaker, on-load switch or disconnecting switch.

According to at least one embodiment, the drive shaft is connected directly or indirectly, in particular via one or more gears, to the motor, in particular to a motor shaft of the motor.

According to at least one embodiment, a position, in particular an absolute position, of the motor shaft corresponds to a position, in particular an absolute position, of the drive shaft. This means that the position of the drive shaft can be unambiguously deduced from the position of the motor shaft, if necessary within a tolerance range.

According to at least one embodiment, the influence includes open-loop control, closed-loop control, braking, acceleration, or stopping of the motor. For example, the closed-loop control may include position control, speed control, acceleration control, or torque control. At least in the case of such forms of control, it can be said that the drive system is a servo drive system.

According to at least one embodiment, the drive system comprises a monitoring unit which is designed to monitor the one or more operations of the switch, on-load tap-changer, diverter switch, selector, double reversing change-over selector, reversing change-over selector, change-over selector, circuit breaker, on-load switch or disconnecting switch using the feedback signal. The monitoring comprises in particular monitoring whether individual operations or parts thereof are carried out in an orderly fashion, in particular within predefined time windows.

According to at least one embodiment, the control device comprises a control unit and a power section for the open-loop- or closed-loop-controlled power supply of the motor. The control unit is designed for actuating the power section in response to at least one desired value, in particular position, speed or acceleration desired value.

According to at least one embodiment, the power section is designed as a converter or servo converter or as an equivalent electronic unit, in particular fully electronic unit, for drive machines.

According to various embodiments, the control device contains all or part of the feedback system.

According to at least one embodiment, the feedback system is designed to determine a first value of the at least two values for the position of the drive shaft according to a first method and to determine a second value of the at least two values for the position of the drive shaft according to a second method, wherein the two methods can differ from each other. This creates at least a redundancy or even a diverse redundancy that further increases operational reliability.

For example, the two methods may be based on the same or different technical or physical principles or may use the same or different components (hardware components).

According to at least one embodiment, one of the at least two values for the position of the drive shaft is a first value for an absolute position of the drive shaft.

According to at least one embodiment, another of the at least two values for the position of the drive shaft is a second value for an absolute position of the drive shaft.

The first value and the second value for the absolute position of the drive shaft can be compared by the control device for example. In the event of a significant deviation, the control device can output an error message or initiate a safety measure.

According to at least one embodiment, one of the at least two values for the position of the drive shaft is an incremental value for a position of the drive shaft or a value for a relative position of the drive shaft.

The first and/or the second value for the absolute position can then be compared by the control device with the incremental or relative value, whereby the plausibility of the first and/or second value for the absolute position can be checked. In the event of a significant deviation, the control device can output an error message and/or initiate a safety measure.

According to at least one embodiment, the feedback system is designed to determine a rotor position of the motor and to determine one of the at least two values for the position of the drive shaft depending on the rotor position.

According to at least one embodiment, the rotor position is an angular range in which a rotor of the motor is located, optionally combined with a number of complete rotations of the rotor.

Depending on the design of the rotor, in particular the number of pole pairs, the position or absolute position of the motor shaft can thus be determined accurately up to at least 180°, for example by the control device. By reduction by means of one or more gears, the accuracy of the position of the drive shaft that can be achieved as a result is significantly greater. In this case, the evaluation by the control device corresponds to a virtual encoder function, so to speak. Even in the event of a complete failure of an absolute encoder of the feedback system, at least one emergency mode can therefore be maintained and/or the switch, in particular on-load tap-changer, can be brought into a safe position.

According to at least one embodiment, the feedback system includes an absolute encoder that is designed and arranged to detect the absolute position of the drive shaft or an absolute position of another shaft that is connected to the drive shaft and to generate at least one output signal based on the detected position. The feedback system is designed to determine one of the at least two values for the position of the drive shaft, in particular the first and/or the second value for the absolute position, on the basis of the at least one output signal.

According to at least one embodiment, the absolute encoder is directly or indirectly attached to the motor shaft, the drive shaft, or a shaft coupled thereto.

According to at least one embodiment, the absolute encoder has a first output for outputting the first or second value for the absolute position and a second output for outputting the incremental or relative value for the position.

The expression “absolute encoder” includes both devices that determine two values for the position in different ways, and devices that contain two separate encoders, at least one of which is an absolute encoder.

According to at least one embodiment, the absolute encoder comprises a multi-turn encoder.

According to at least one embodiment, the absolute encoder is configured to detect the position of the drive shaft or the position of the further shaft on the basis of a first sampling method.

According to at least one embodiment, the absolute encoder is designed to additionally detect the position of the drive shaft or the position of the further shaft on the basis of a second sampling method that is independent of the first sampling method.

According to at least one embodiment, the first or second sampling method includes an optical, a magnetic, a capacitive, a resistive, or an inductive sampling method.

According to at least one embodiment, the first sampling method differs from the second sampling method.

According to at least one embodiment, the absolute encoder is connected to the drive shaft, the motor shaft or the further shaft in an interlocked manner.

According to at least one embodiment, the absolute encoder is additionally connected to the drive shaft, the motor shaft or the further shaft in a frictionally engaged or integrally bonded manner, for example by means of an adhesive connection.

The interlocked and additional integrally bonded or frictionally engaged connection further increases the attachment of the absolute encoder and ultimately the operational reliability.

According to and embodiment of the improved concept, a method for driving an on-load tap-changer is also provided. The method comprises determining at least two values for an absolute position of a drive shaft for driving the on-load tap-changer, generating a feedback signal on the basis of the at least two values and controlling a motor for driving the on-load tap-changer depending on the feedback signal.

Further embodiments and implementations of the method are directly apparent from the various embodiments of the tap changer assembly. In particular, individual or multiple components and/or arrangements which are described in relation to the tap changer assembly can be correspondingly implemented for carrying out the method.

In the following, aspects of the invention are explained in detail on the basis of exemplary embodiments with reference to the drawings. Components which are identical or functionally identical or which have an identical effect may be provided with identical reference signs. Identical components or components having an identical function may in some cases be explained only in relation to the figure in which they first appear. The explanation is not necessarily repeated in the subsequent figures.

FIG. 1 shows a schematic representation of an exemplary embodiment of a switch assembly 1 according to the improved concept with a switch 17 and a drive system 3, which is connected to the switch 17 via a drive shaft 16. The switch 17 can be an on-load tap-changer, diverter switch, selector, double reversing change-over selector, reversing change-over selector, change-over selector, circuit breaker, on-load switch or disconnecting switch. The drive system 3 includes a motor 12, which can drive the drive shaft 16 via a motor shaft 16 and optionally via a gear unit 15. A control device 2 of the drive system 3 comprises a power section 11, which contains for example a converter, for the open-loop- or closed-loop-controlled power supply of the motor 12, and a control unit 10 for actuating the power section 11, for example via a bus 18. The drive system 3 has an encoder system 13, which serves as a feedback system 4 or is part of the feedback system 4 and is connected to the power section 11. Furthermore, the encoder system 13 is directly or indirectly coupled to the drive shaft 16.

The encoder system 13 is designed to detect a first value for a position, in particular an angular position, for example an absolute angular position, of the drive shaft 16. For this purpose, the encoder system 13 can comprise, for example, an absolute encoder, in particular a multi-turn absolute encoder, which is attached to the drive shaft 16, the motor shaft 14 or another shaft of which the position is unambiguously linked to the absolute position of the drive shaft 16. For example, the position of the drive shaft 16 can be unambiguously determined from the position of the motor shaft 14, for example via a transmission ratio of the gear unit 15.

The fastening of the absolute encoder is embodied, for example, as a combination of an interlocked connection with a frictionally engaged and/or integrally bonded connection.

The feedback system 4 is additionally adapted to detect a second value for the position of the drive shaft 16.

For this purpose, the encoder system 13 may be designed to detect the second value, in particular using a method which is different from a method according to which the first value for the position of the drive shaft 16 is detected.

Alternatively or additionally, the control device 2 can be designed to determine the second value from a rotor position of the motor 12, effectively thus having a virtual encoder for detecting the second value. For this purpose, for example, an inductive feedback may be utilized by the movement of the rotor in motor windings of the motor 12. Since a strength of the feedback varies periodically, signal analysis, for example FFT analysis, can be used to approximate the rotor position in particular. Since one full revolution of the drive shaft 16 corresponds to a plurality of revolutions of the rotor, the position of the drive shaft 16 can be inferred therefrom with much higher accuracy.

The control device 2, in particular the control unit 10 and/or the power section 11, is designed to control the motor 12 in an open-loop or closed-loop fashion depending on a feedback signal generated by the feedback system on the basis of the first and second values.

The control device 2, for example the control unit 10, can, for example, reconcile the two values for the position of the drive shaft 16 and/or perform a plausibility check of the position determination.

Figure 2:
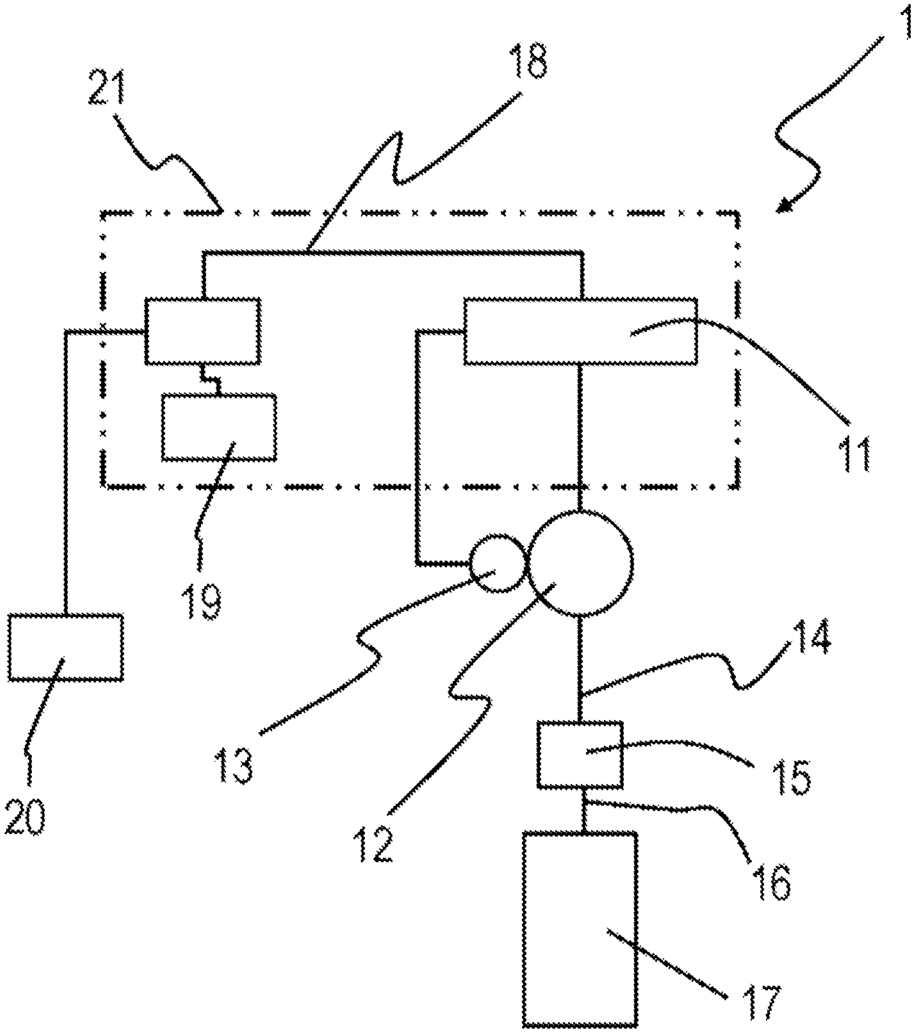
FIG. 2 a schematic representation of a further exemplary embodiment of a switch assembly according to the improved concept.

FIG. 2 shows a schematic representation of a further exemplary embodiment of a switch assembly 1 according to the improved concept, which is based on the embodiment according to FIG. 1.

The switch device 1 here optionally has a control cabinet 21, within which the control unit 10, the power section 11 and an optional man-machine interface 19 are arranged. The man-machine interface 19 is connected to the control unit 10 and can serve for control, maintenance or configuration purposes, for example during or outside of operation.

The motor 12, the motor shaft 14 the encoder system 13 and/or the gear unit 15 can be located inside or outside the control cabinet.

The switch assembly 1, in particular the control unit 10, is coupled to a safety device 20, which comprises, for example, a circuit breaker, in order to disconnect the switch assembly 1 or an item of electrical equipment to which the switch assembly 1 is assigned from a power network, for example in the event of a fault or malfunction of the switch assembly 1.

A switch assembly 1 according to the improved concept increases the operational safety of the drive system 3, the switch 17 and the equipment. By means of the described double position determination and corresponding comparisons, the residual risk of an incorrect position determination is reduced.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS

1 Switch assembly
2 Control device
3 Drive system
4 Feedback system
10 Control unit
11 Power section
12 Motor
13 Encoder system
14 Motor shaft
15 Gear unit
16 Drive shaft
17 Switch
18 Bus
19 Man-machine interface
20 Safety device
21 Control cabinet

The invention claimed is:

1. A switch assembly, the switch assembly comprising:
a switch; and
a drive system for the switch, the drive system comprising:
a drive shaft connecting the drive system to the switch;
a motor configured to drive the drive shaft; and
a feedback system, which is configured
to determine at least two values for a position of the drive shaft; and
to generate a feedback signal on the basis of the at least two values; and
a control device which is configured to influence an operation of the motor depending on the feedback signal.

2. The switch assembly as claimed in claim 1,
wherein the feedback system is configured to determine each of the at least two values for the position of the drive shaft in accordance with an associated method, and
wherein all methods for determining the at least two values differ from each other or are identical.

3. The switch assembly as claimed in claim 1, wherein one of the at least two values for the position of the drive shaft is a first value for an absolute position of the drive shaft.

4. The switch assembly as claimed in claim 1, wherein one of the at least two values for the position of the drive shaft is a second value for an absolute position of the drive shaft.

5. The switch assembly as claimed in claim 1, wherein one of the at least two values for the position of the drive shaft is an incremental value for a position of the drive shaft or a value for a relative position of the drive shaft.

6. The switch assembly as claimed in claim 1, wherein the feedback system is configured to determine a rotor position of the motor and to determine one of the at least two values for the position of the drive shaft depending on the rotor position.

7. The switch assembly as claimed in claim 1, wherein the switch is an on-load tap-changer or a diverter switch or selector or a double reversing change-over selector or a reversing change-over selector or a change-over selector or a circuit breaker or an on-load switch or a disconnecting switch.

8. The switch assembly as claimed in claim 1,
wherein the feedback system comprises an absolute encoder which is configured and arranged to detect the absolute position of the drive shaft or an absolute position of another shaft connected to the drive shaft and to generate at least one output signal on the basis of the detected position; and
wherein the feedback system is configured to determine one of the at least two values for the position of the drive shaft based on the at least one output signal.

9. The switch assembly as claimed in claim 8, wherein the absolute encoder is designed as a multi-turn encoder.

10. The switch assembly as claimed in claim 8, wherein the absolute encoder is connected to the drive shaft or the further shaft in an interlocked manner.

11. The switch assembly as claimed in claim 10, wherein the absolute encoder is additionally connected to the drive shaft or the further shaft in a frictionally engaged or integrally bonded manner.

12. The switch assembly as claimed in claim 8, wherein the absolute encoder is configured to detect the position of the drive shaft or the position of the further shaft on the basis of a first sampling method.

13. The switch assembly as claimed in claim 12, wherein the absolute encoder is configured to additionally detect the position of the drive shaft or the position of the further shaft on the basis of a second sampling method that is independent of the first sampling method.

14. The switch assembly as claimed in claim 13, wherein the first sampling method comprises an optical, a magnetic, a capacitive or an inductive sampling method.

15. A method for driving a switch, the method comprising:

determining at least two values for an absolute position of a drive shaft for driving the switch;

generating a feedback signal on the basis of the at least two values; and controlling a motor for driving the switch depending on the feedback signal.

16. A drive system for actuating a switch, the drive system comprising:

a drive shaft configured to connect the drive system to the switch;

a motor configured to drive the drive shaft; and a feedback system for double position determination of the drive shaft, the feedback system being configured:

to separately and concurrently determine;

a first position value from which a position of the drive shaft is unambiguously determinable; and a second position value from which the position of the drive shaft is unambiguously determinable independently from the first position value, and to generate a feedback signal on the basis of the first position value and the second position value; and a control device which is configured to influence an operation of the motor depending on the feedback signal.

17. The drive system according to claim 16, wherein the control device is further configured to output an error message or initiate a safety measure based on comparing the first position value and the second position value.

18. The drive system according to claim 16, wherein the feedback system comprises an absolute encoder configured and arranged to:

determine the first position value based on detecting the position of the driveshaft using a first sampling method; and determine the second position value based on detecting the position of the driveshaft using a second sampling method that is independent of the first sampling method.

19. The drive system according to claim 17, wherein the absolute encoder is directly or indirectly attached to a motor shaft, the drive shaft, or a shaft coupled to the drive shaft, wherein the motor comprises the motor shaft and the motor shaft is coupled to the drive shaft, wherein the first sampling method and the second sampling method are selected from the group consisting of an optical sampling method, a magnetic sampling method, a capacitive sampling method, a resistive sampling method, and an inductive sampling method, and wherein the first sampling method is different than the second sampling method.

20. A switch assembly, the switch assembly comprising the switch configured as an on-load tap-changer, and the drive system according to claim 16, wherein the drive shaft connects the drive system to the switch, wherein the motor comprises a rotor coupled to and configured to drive the drive shaft, wherein the feedback system is further configured to:

determine a rotor position of the motor; and determine the first position value based on the rotor position, wherein the rotor position is an angular range in which the rotor of the motor is located combined with a number of complete rotations of the rotor.

* * * * *